(12) United States Patent
Jun et al.

(10) Patent No.: US 11,094,468 B2
(45) Date of Patent: Aug. 17, 2021

(54) MULTILAYER CERAMIC ELECTRONIC COMPONENT

(71) Applicant: Samsung Electro-Mechanics Co., Ltd., Suwon-si (KR)

(72) Inventors: A Reum Jun, Suwon-si (KR); Hye Won Ryoo, Suwon-si (KR); Ho In Jun, Suwon-si (KR); Seok Keun Ahn, Suwon-si (KR); Ji Hye Yu, Suwon-si (KR); Gi Seok Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 91 days.

(21) Appl. No.: 16/255,077

(22) Filed: Jan. 23, 2019

(65) Prior Publication Data
US 2020/0152388 A1 May 14, 2020

(30) Foreign Application Priority Data

Nov. 13, 2018 (KR) .......................... 10-2018-0139145

(51) Int. Cl.
| | |
|---|---|
| *H01G 4/30* | (2006.01) |
| *H01G 4/012* | (2006.01) |
| *H01G 4/232* | (2006.01) |
| *H01G 4/224* | (2006.01) |
| *H01G 4/248* | (2006.01) |
| *H01G 4/12* | (2006.01) |

(52) U.S. Cl.
CPC .............. *H01G 4/30* (2013.01); *H01G 4/224* (2013.01); *H01G 4/2325* (2013.01); *H01G 4/248* (2013.01); *H01G 4/012* (2013.01); *H01G 4/1227* (2013.01)

(58) Field of Classification Search
None
See application file for complete search history.

(56) References Cited

U.S. PATENT DOCUMENTS

| | | | | |
|---|---|---|---|---|
| 7,295,422 B2* | 11/2007 | Ito | ............................. | H01G 4/08 361/321.5 |
| 7,804,678 B2* | 9/2010 | Wu | ........................... | H01G 4/06 361/311 |
| 7,979,120 B2* | 7/2011 | Sherwood | ............... | A61N 1/375 361/311 |

(Continued)

FOREIGN PATENT DOCUMENTS

| | | |
|---|---|---|
| JP | 2000-311828 A | 7/2000 |
| JP | 2002-293620 A | 9/2002 |

*Primary Examiner* — Dion Ferguson
(74) *Attorney, Agent, or Firm* — Morgan, Lewis & Bockius LLP

(57) ABSTRACT

A multilayer ceramic electronic component includes a ceramic body including dielectric layers and first and second internal electrodes alternately laminated with respective dielectric layers disposed therebetween to be exposed to first and second external surfaces of the ceramic body, and first and second external electrodes disposed on the first and second external surfaces of the ceramic body and connected to corresponding internal electrodes, among the first and second internal electrodes, respectively. The dielectric layer includes a portion, disposed between the first and second external electrodes, having a thickness of 3.5 micrometers or more to 3.7 micrometers or less.

16 Claims, 5 Drawing Sheets

(56) References Cited

U.S. PATENT DOCUMENTS

| | | | | |
|---|---|---|---|---|
| 8,054,082 | B2* | 11/2011 | Brothier | G01N 1/2247 |
| | | | | 250/389 |
| 2004/0107555 | A1* | 6/2004 | Hattori | H01G 4/30 |
| | | | | 29/25.42 |
| 2005/0152095 | A1* | 7/2005 | Nakano | H01G 4/1227 |
| | | | | 361/321.4 |
| 2006/0120020 | A1* | 6/2006 | Dowgiallo, Jr. | H01G 4/1218 |
| | | | | 361/313 |
| 2006/0214263 | A1* | 9/2006 | Kojima | H01G 4/30 |
| | | | | 257/532 |
| 2007/0142209 | A1* | 6/2007 | Ito | H01G 4/1227 |
| | | | | 501/137 |
| 2012/0306325 | A1* | 12/2012 | Kim | H01G 4/12 |
| | | | | 310/366 |
| 2014/0022690 | A1* | 1/2014 | Kim | H01G 4/30 |
| | | | | 361/301.4 |
| 2016/0099106 | A1* | 4/2016 | Kurokawa | H01F 27/2804 |
| | | | | 361/301.4 |
| 2017/0154733 | A1* | 6/2017 | Lee | H01G 4/308 |
| 2017/0243695 | A1* | 8/2017 | Kim | H01G 4/248 |
| 2018/0012702 | A1* | 1/2018 | Azuma | H05K 1/181 |
| 2018/0197682 | A1* | 7/2018 | Yamada | H01G 4/30 |

* cited by examiner

MULTILAYER CERAMIC ELECTRONIC COMPONENT

CROSS-REFERENCE TO RELATED APPLICATION(S)

This application claims benefit of priority to Korean Patent Application No. 10-2018-0139145 filed on Nov. 13, 2018 in the Korean Intellectual Property Office, the disclosure of which is incorporated herein by reference in its entirety.

TECHNICAL FIELD

The present disclosure relates to a multilayer ceramic electronic component.

BACKGROUND

Multilayer ceramic electronic components are widely used as IT components in computers, PDAs, mobile phones, and the like, due to advantages thereof such as compactness, guaranteed high capacitance, and ease of mountability. Also, such multilayer ceramic electronic components are widely used as electric components due to high reliability and high strength characteristics thereof.

Recently, a stacking number per unit thickness of a multilayer ceramic electronic component has been increased to secure high capacitance.

Accordingly, techniques for thinning and atomizing dielectric layers have been researched.

However, multilayer ceramic electronic components are becoming vulnerable to dielectric breakdown resulting from thinning and atomization of dielectric layers.

SUMMARY

An aspect of the present disclosure is to provide a multilayer ceramic electronic component which relatively significantly suppresses dielectric breakdown without significantly increasing a thickness of a dielectric layer.

According to an aspect of the present disclosure, a multilayer ceramic electronic component includes a ceramic body including dielectric layers and first and second internal electrodes alternately laminated with respective dielectric layers disposed therebetween to be exposed to first and second external surfaces of the ceramic body, and first and second external electrodes disposed on the first and second external surfaces of the ceramic body and connected to corresponding internal electrodes, among the first and second internal electrodes, respectively. The dielectric layer includes a portion, disposed between the first and second external electrodes, having a thickness of 3.5 micrometers or more to 3.7 micrometers or less.

According to an aspect of the present disclosure, a multilayer ceramic electronic component includes a ceramic body including dielectric layers and first and second internal electrodes alternately laminated with respective dielectric layers disposed therebetween to be exposed to first and second external surfaces of the ceramic body, and first and second external electrodes disposed on the first and second external surfaces of the ceramic body and connected to corresponding internal electrodes, among the first and second internal electrodes, respectively. A distance between the first and second internal electrodes in a thickness direction is 3.5 micrometers or more to 3.7 micrometers or less, based on a thickness-direction axis of a center of the ceramic body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
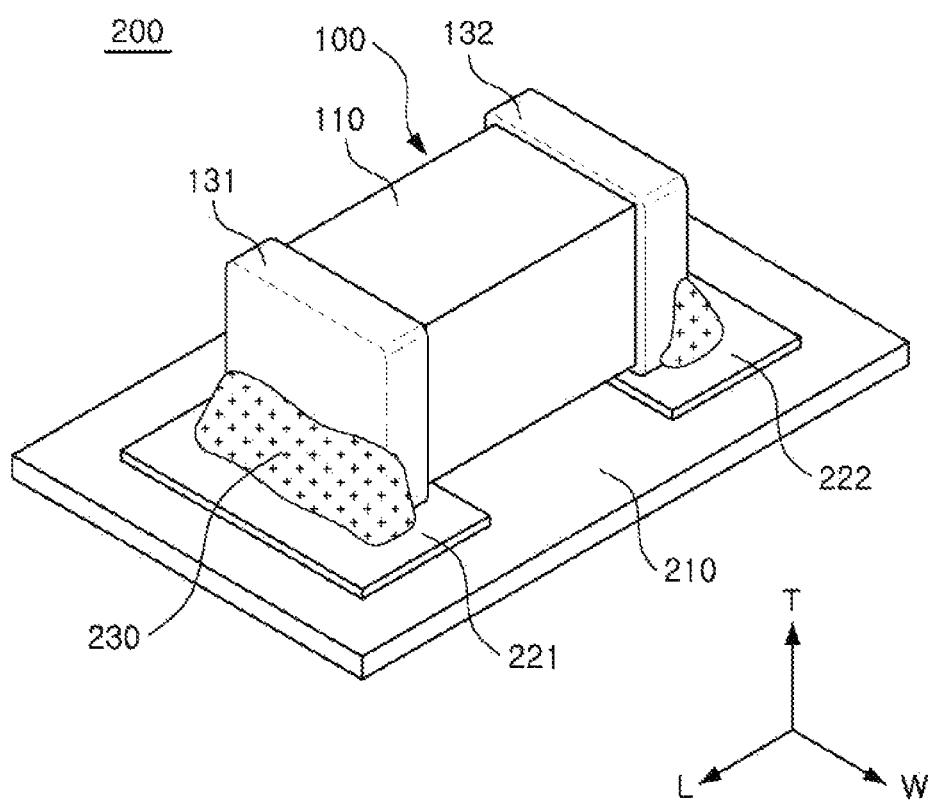
FIG. 1 is a perspective view illustrating a multilayer ceramic electronic component and a mounting form thereof according to an exemplary embodiment in the present disclosure.

Hereinafter, embodiments of the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Through the specification, in addition, unless explicitly described to the contrary, the word "comprise" and variations such as "comprises" or "comprising," will be understood to imply the inclusion of stated elements but not the exclusion of any other elements.

Directions of a hexahedral ceramic body will be defined in order to clearly describe an embodiment of the invention. L, W and T shown throughout the drawings refer to a length direction, a width direction, and a thickness direction, respectively. Here, the thickness direction may be the same as a direction in which dielectric layers are laminated.

Hereinafter, a multilayer ceramic electronic component according to an exemplary embodiment in the present disclosure will be described. In detail, a multilayer ceramic capacitor will be described. However, the present disclosure is not limited thereto.

FIG. 1 is a perspective view illustrating a multilayer ceramic electronic component and a mounting from thereof according to an exemplary embodiment in the present disclosure.

Referring to FIG. 1, a multilayer ceramic electronic component 100 may include a ceramic body 110 and first and second external electrodes 131 and 132, and may be mounted (200) on first and second electrode pads 221 and 222 on a board 210.

The ceramic body 110 may be formed as a hexahedron having two side surfaces in a length direction L, two side surfaces in a width direction W, and two side surfaces in a thickness direction T. The ceramic body 110 may be formed by laminating a plurality of dielectric layers 111 (shown in FIGS. 3A, 3B, 5A, and 5B) in the thickness direction T and then sintering the plurality of dielectric layers 111. Shapes and dimensions of the ceramic body 110 and the number of laminated dielectric layers 111 (one or more) are not limited to those of an example illustrated in the exemplary embodiment.

The plurality of dielectric layers 111 disposed in the ceramic body 110 may be in a sintered state, and adjacent dielectric layers 111 may be integrated with each other so that boundaries therebetween are not readily apparent without using a scanning electron microscope (SEM).

For example, the ceramic body may be in the form of a hexahedron having eight rounded corners. Accordingly, durability and reliability of the ceramic body 110 may be improved, and structural reliability of the first and second external electrodes 131 and 132 at the corners may be improved.

A thickness of the dielectric layer 111 may be arbitrarily changed in accordance with a capacitance design of the multilayer ceramic electronic component 100, and the dielectric layer 111 may contain ceramic powder particles having a high dielectric constant, such as barium titanate ($BaTiO_3$)-based powder particles or strontium titanate ($SrTiO_3$)-based powder particles. However, a material thereof is not limited thereto. Further, various ceramic additives, organic solvents, plasticizers, binders, dispersing agents, and the like, may be added to the ceramic powder particles, according to the object of the present disclosure.

An average particle size of a ceramic powder used to form the dielectric layer 111 is not limited and may be controlled to achieve the object of the present disclosure. For example, the average particle size may be controlled to be 400 nanometers (nm) or less. Accordingly, the multilayer ceramic electronic component 100 according to an exemplary embodiment may be used as a component requiring a large size and high capacitance as in the case of IT components.

For example, the dielectric layer 111 may be formed by applying slurry containing a powder such as a barium titanate ($BaTiO_3$)-based powder to carrier films and drying the applied slurry to prepare a plurality of ceramic sheets. The ceramic sheet may be manufactured by mixing the ceramic powder, a binder, and a solvent to prepare the slurry and manufacturing the prepared slurry in a sheet shape having a thickness of several micrometers (μm) by a doctor blade method, but the manufacturing method of the ceramic sheet is not limited thereto.

The first and second external electrodes 131 and 132 may be disposed on first and second external surfaces (for example, one external surface and the other external surfaces in the length direction) of the ceramic body 110 to be connected to first and second internal electrodes, respectively. Also the first and second external electrodes 131 and 132 may be configured to electrically connect the first and second internal electrodes to a board.

For example, the first and second external electrodes 131 and 132 may be formed of one of copper (Cu), palladium (Pd), platinum (Pt), gold (Au), silver (Ag), and lead (Pb), or alloys thereof.

For example, the first and second external electrodes 131 and 132 may include first and second base electrode layers containing copper (Cu) and/or nickel (Ni), and first and second plating layers containing nickel (Ni) and/or tin (Sn) and displaced on the first and second base electrode layers, respectively.

The first and second base electrode layers may be formed by dipping into a paste containing a metal component or printing a conductive paste containing a conductive metal on at least one surface of the ceramic body in a thickness direction T. Alternatively, the first and second base electrode layers may be formed by a sheet transfer method or a pad transfer method, but a forming method thereof is not limited thereto.

The first and second plating layers may be formed using sputtering or electric deposition, but a forming method thereof is not limited thereto.

The first and second external electrodes 131 and 132 may be electrically connected to the first and second electrode pads 221 and 222 through first and second solders 230, respectively. For example, the first and second solders 230 may be more closely connected to the first and second external electrodes 131 and 132 according to a reflow process.

Figure 2:
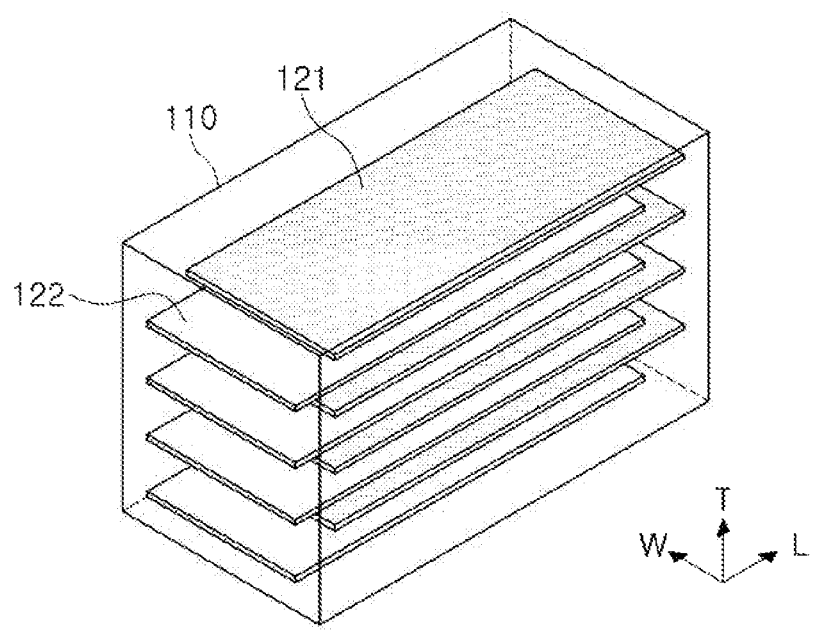
FIG. 2 is a perspective view illustrating a shape of an internal electrode of a multilayer ceramic electronic component according to an exemplary embodiment in the present disclosure.

FIG. 2 is a perspective view illustrating a shape of an internal electrode of a multilayer ceramic electronic component according to an exemplary embodiment in the present disclosure.

Referring to FIG. 2, a ceramic body includes first and second internal electrodes 121 and 122, and a plurality of dielectric layers. The first and second internal electrodes 121 and 122 are alternately laminated with respective dielectric layers disposed therebetween to be exposed to a first external surface and a second external surface of the ceramic body 110 (for example, one external surface and the other external surface of the ceramic body 110 in the length direction) to have polarities opposite to each other.

The first internal electrodes 121 and the second internal electrodes 122 may be formed in a laminating direction of the dielectric layers to be alternately exposed to one external surface and the other external surface of the ceramic body 110 in the length direction L of the ceramic body 110 by printing a conductive paste containing a conductive metal thereon. The first internal electrodes 121 and the second internal electrodes 122 may be electrically insulated from each other by respective dielectric layers disposed therebetween.

For example, the first and second internal electrodes 121 and 122 may be electrically connected to the first and second external electrodes 131 and 132 disposed on both external surfaces of the ceramic body 110 in the length direction L of the ceramic body 110 through portions alternately exposed to both external surfaces of the ceramic body 110 in the length direction L of the ceramic body 110, respectively.

For example, the first and second internal electrodes 121 and 122 by formed by a conductive paste for an internal electrode having an average particle size of 0.1 to 0.2 μm and containing 40 wt % to 50 wt % of conductive metal powder particles, but the conductive paste thereof is not limited thereto.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode pattern is printed may be laminated, pressed, and sintered to manufacture the ceramic body 110.

Accordingly, when a voltage is applied to the first and second eternal electrodes 131 and 132 opposing each other, charges are accumulated between the first and second internal electrodes 121 and 122. In this case, capacitance of the multilayer ceramic electronic component 100 is in proportion to an area of a region in which the first and second internal electrodes 121 and 122 overlap each other.

For example, when the overlapping area of the first and second internal electrodes 121 and 122 is significantly increased, capacitance of even a capacitor having the same size may be significantly increased.

Since a thickness of a dielectric layer corresponds to a distance between the first and second internal electrodes 121 and 122, the capacitance of the multilayer ceramic electronic component 100 may be increased as the thickness of the dielectric layer is decreased.

The first and second internal electrodes 121 and 122 may be formed of one of nickel (Ni), copper (Cu), palladium (Pd), silver (Ag), lead (Pb), and platinum (Pt), or alloys thereof, but a material thereof is not limited thereto.

Withstand voltage characteristics of the ceramic body 110 may be improved as the distance between the first and second internal electrodes 121 and 122 is increased.

In the case in which the multilayer ceramic electronic component 100 is required to have withstand voltage characteristics that are as high as those of an electric component, the multilayer ceramic electronic component 100 may be designed in such a manner that an average thickness of dielectric layers may exceed twice an average thickness of each of the first and second internal electrodes 121 and 122. Accordingly, the multilayer ceramic electronic component 100 may have high withstand voltage characteristics to be used as an electric component. An average of the respective thicknesses of the first and second internal electrodes 121 and 122 may be greater than zero and less than 1.0 μm.

Durability (for example, flexural strength) of the ceramic body 110 may have improved reliability when a width of the ceramic body exceeds 0.5 times a thickness thereof.

Figure 3A:
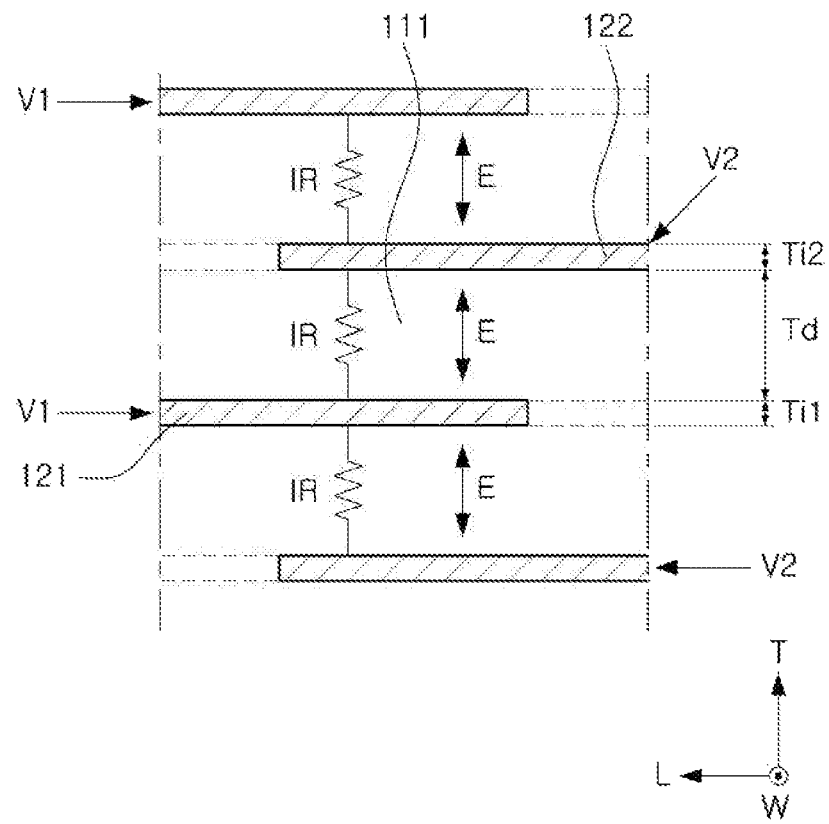
FIG. 3A is an enlarged side view of internal electrodes and dielectric layers of a multilayer according to an exemplary embodiment in the present disclosure.

FIG. 3A is an enlarged side view of internal electrodes and dielectric layers of a multilayer according to an exemplary embodiment in the present disclosure.

Referring to FIG. 3A, a dielectric layer 111 has a thickness Td, and an internal electrode 121 has a thickness Ti1 and a second internal electrode 122 may have a thickness Ti2.

When first and second voltages V1 and V2 are applied to the first and second internal electrodes 121 and 122, respectively, an electric field E may be generated between the first and second internal electrodes 121 and 122.

The electric field E is a value obtained by dividing a distance between the first and second internal electrodes 121 and 122 from a difference between the first and second voltages V1 and V2. Therefore, the shorter between the first and second internal electrodes 121 and 122, the larger the electric field.

The dielectric layer 111 has internal resistance IR. In the case in which the electric field E is smaller than an electric field corresponding to a dielectric breakdown voltage of the dielectric layer 111, the dielectric layer 111 may have similar internal resistor IR to a nonconductor. For example, the internal resistance IR may be about 1 megohm (Mohm).

In the case in which the electric field E is greater than or equal to an electric field corresponding to a dielectric breakdown voltage of the dielectric layer 111, dielectric breakdown occurs in the dielectric layer 111.

Figure 3B:
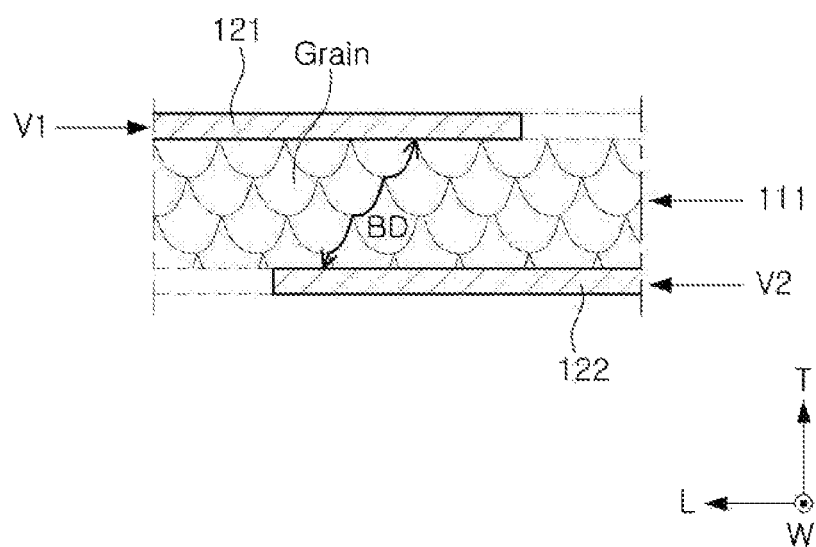
FIG. 3B is a side view illustrating dielectric breakdown of a multilayer ceramic electronic component.

FIG. 3B is a side view illustrating dielectric breakdown of a multilayer ceramic electronic component.

Referring to FIG. 3B, a dielectric layer 111 may include a collection of a plurality of grains based on ceramic power particles.

When the dielectric breakdown occurs in the dielectric layer 111, a dielectric breakdown current BD may flow along boundaries between the plurality of grains.

Figure 4:
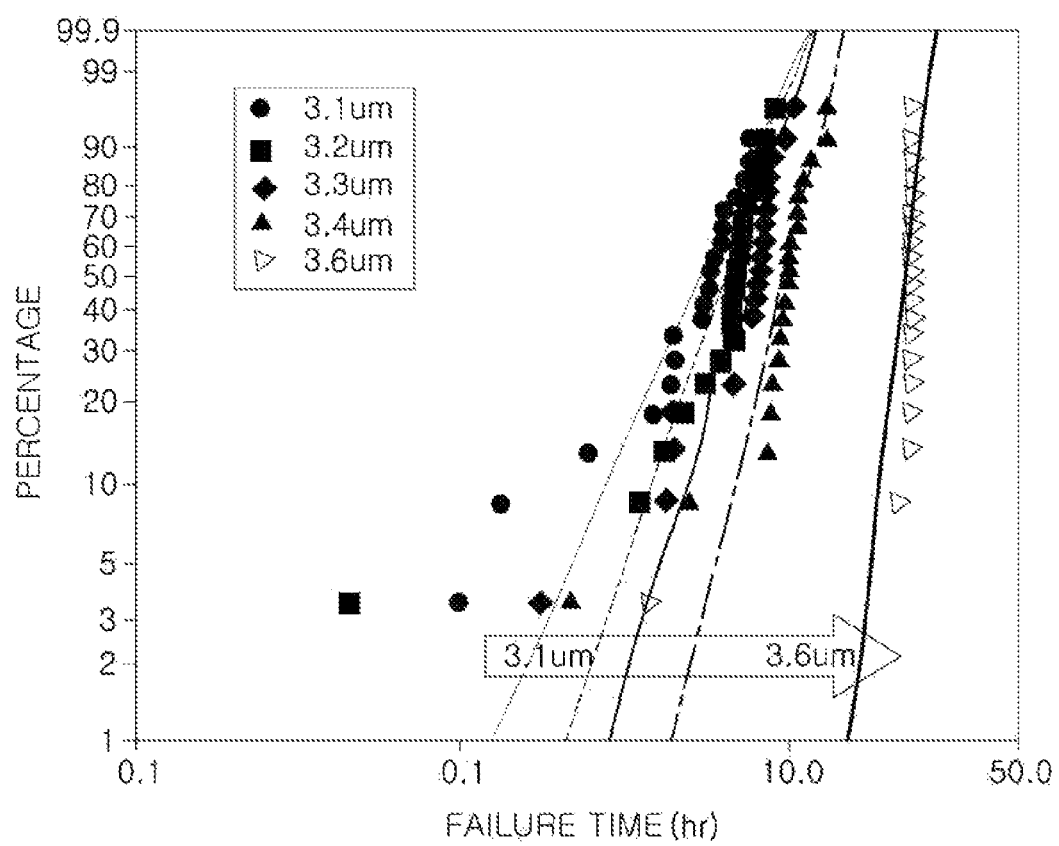
FIG. 4 is a graph illustrating a result of a highly accelerated life test depending on a thickness of a dielectric layer.

FIG. 4 is a graph illustrating a result of a highly accelerated life test depending on a thickness of a dielectric layer.

The highly accelerated life test is performed by measuring a ratio of samples, having internal resistance IR deteriorated to 1/1000 times or less, to a plurality of samples when a voltage different of 3 volts is applied to first and second external electrodes at a temperature of 150 degrees Celsius for 24 hours.

The plurality of samples may be divided into a first group including a dielectric layer having a thickness of 3.1 micrometers (μm), a second group including a dielectric layer having a thickness of 3.2 μm, a third group including a dielectric layer having a thickness of 3.3 μm, a fourth group including a dielectric layer having a thickness of 3.4 μm, and a fifth group including a dielectric layer having a thickness of 3.6 μm.

Referring to FIG. 4, shapes of a plurality of dots are shown to be different depending on thicknesses of dielectric layers. A horizontal axis represents a log scale.

The highly accelerated life test is performed by recording points of time, at which the number of samples having internal resistance IR deteriorated to 1/1000 times or less increases, on the graph of FIG. 4 while performing a highly accelerated life test on the respective first to five groups.

For example, when the total number of a plurality of samples of each of the first to fourth groups is m, the graph of FIG. 4 may show a dot of a horizontal position corresponding to a point of time, at which an nth sample is deteriorated in the respective group, and a vertical position corresponding to percentage of ((100/m)*n) (%).

In the first group, all the plurality of samples having a thickness of 3.1 μm were deteriorated when about 9 hours had passed.

In the second group, all the plurality of samples having a thickness of 3.2 μm were deteriorated when about 10 hours had passed.

In the third group, all the plurality of samples having a thickness of 3.3 μm were deteriorated when about 11 hours had passed.

In the fourth group, all the plurality of samples having a thickness of 3.4 μm were deteriorated when about 13 hours had passed.

In the fifth group, a ratio of samples, deteriorated when 24 hours have passed, to the plurality of samples having a thickness of 3.6 μm is 10%.

For example, a dielectric layer may have a critical point at a thickness more than 3.4 μm to less than 3.6 μm. The critical point refers to a point at which the degree of reduction in dielectric breakdown is rapidly increased, as compared to an increase in thickness of the dielectric layer.

Additionally, the dielectric layer may significantly suppress the dielectric breakdown when the dielectric layer has a thickness within an optimum thickness range.

A minimum of the thickness range may be close to the critical value.

Accordingly, the optimum thickness range may be 3.5 μm or more to 3.7 μm or less.

A multilayer ceramic electronic component according to an exemplary embodiment may include a dielectric layer having a thickness of 3.5 μm or more to 3.7 μm or less to significantly suppress dielectric breakdown without significantly increasing a thickness of the dielectric layer.

A multilayer ceramic electronic component according to an exemplary embodiment may have a structure, in which a distance between the first and second internal electrodes in a thickness direction is 3.5 μm or more to 3.7 μm or less, to significantly suppress dielectric breakdown without significantly increasing a thickness of the dielectric layer.

Figure 5A:
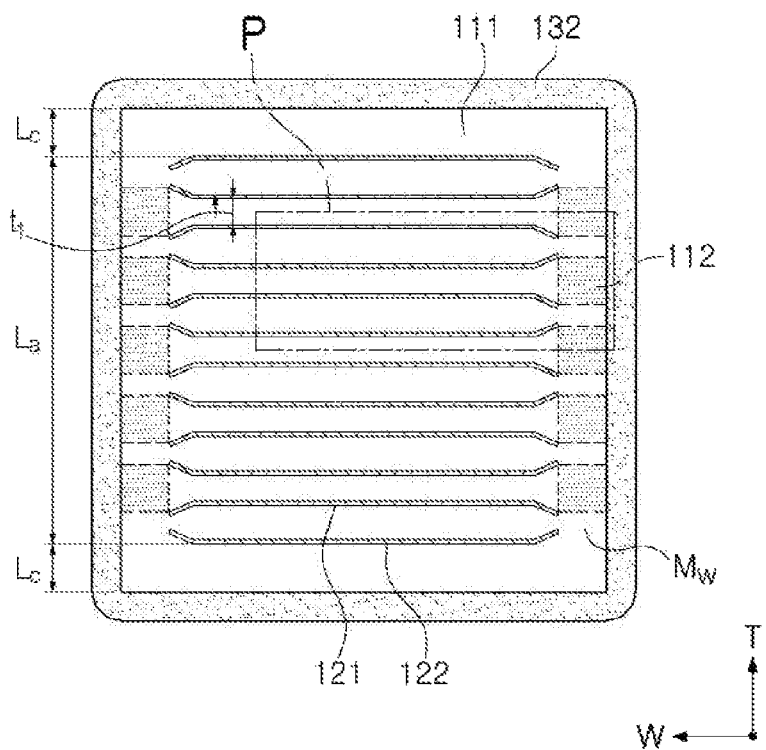
FIG. 5A is a cross-sectional view when a multilayer ceramic electronic component according to an exemplary embodiment in the present disclosure is viewed in a length direction.

FIG. 5A is a cross-sectional view when a multilayer ceramic electronic component according to an exemplary embodiment in the present disclosure is viewed in a length direction.

Referring to FIG. 5A, a ceramic body may further include top and bottom cover layers, disposed on a top surface and a bottom surface of the first and second internal electrodes 121 and 122, respectively, each having a thickness Lc. Also the ceramic body may further include a step absorption member 112 disposed in a lateral margin portion Mw. The thickness Lc may be greater than a distance t1 between the first and second internal electrodes 121 and 122. Accordingly, the ceramic body may have improved strength (for example, flexural strength and tensile stress).

The first and second internal electrodes 121 and 122 may be disposed on an active layer having a thickness La. Depending on a design, the first and second internal electrodes 121 and 122 may be bent at an edge in a width direction before being pressed in a thickness direction in a manufacturing process. Then, the bent portion of the first and second internal electrodes 121 and 122 may be planarized by the pressing and the step absorption member 112.

Figure 5B:
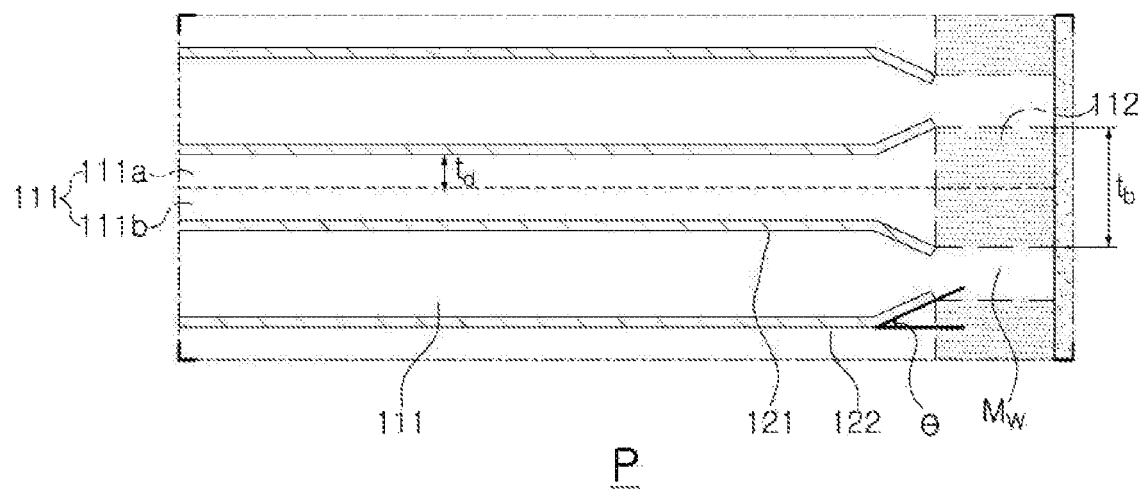
FIG. 5B is a cross-sectional view of a second dielectric layer of a multilayer ceramic electronic component according to an exemplary embodiment in the present disclosure, and is an enlarged view of region P in FIG. 5A.

FIG. 5B is a cross-sectional view of a second dielectric layer of a multilayer ceramic electronic component according to an exemplary embodiment in the present disclosure, and is an enlarged view of region P in FIG. 5A.

Referring to FIG. 5B, the dielectric layer 111 may include a first dielectric layer 111a and a second dielectric layer 111b. The second dielectric layer 111b may be laminated between the first dielectric layer 111a and the second internal electrode 122.

Depending on a design, two or more dielectric layers 111 may be provided between the first and second internal electrodes 121 and 122.

Each of the first and second dielectric layers 111a and 111b may have a thickness td and may be equal to about half a distance between the first and second internal electrodes 121 and 122.

In the case in which the first and second internal electrodes 121 and 122 are bent on the edge in the width direction at an angle θ, the first and second internal electrodes 121 and 122 may have a distance tb on the edge in the width direction and tb may be twice greater than td.

The distance t1 between the first and second internal electrodes 121 and 122, shown in FIG. 5A, is defined as an axial reference distance of a center of the ceramic body in the thickness direction.

Similarly, a thickness of the dielectric layer 111 may be defined as an axial reference thickness of the center of the ceramic body in the thickness direction.

As described above, a multilayer ceramic electronic component according to an exemplary embodiment may significantly suppress dielectric breakdown without significantly increasing a thickness of a dielectric layer.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and first and second internal electrodes alternately laminated in a thickness direction of the ceramic body with respective dielectric layers disposed therebetween to be respectively exposed to first and second external surfaces of the ceramic body opposing each other in a length direction of the ceramic body; and
first and second external electrodes disposed on the first and second external surfaces of the ceramic body and connected to the first and second internal electrodes, respectively,
wherein one of the dielectric layers includes a portion having a thickness of 3.5 micrometers or more,
the ceramic body further includes a step absorption member disposed in a lateral margin portion disposed on one side of the ceramic body in a width direction of the ceramic body, and
in a width direction-thickness cross-section, an end portion of the first internal electrode and an end portion of the second internal electrode immediately adjacent to the first internal electrode connected to the step absorption members are bent in opposite directions.

2. The multilayer ceramic electronic component of claim 1, wherein the ceramic body further includes a cover layer disposed on a top surface or a bottom surface of the first and second internal electrodes, and
the cover layer has a thickness greater than the thickness of the portion of the one of dielectric layers.

3. The multilayer ceramic electronic component of claim 2, wherein the thickness of the portion of the one of the dielectric layers is equal to or greater than twice a thickness of one of the first and second internal electrodes.

4. The multilayer ceramic electronic component of claim 3, wherein an average of the respective thicknesses of the first and second internal electrodes is greater than zero micrometer and less than 1.0 micrometer.

5. The multilayer ceramic electronic component of claim 1, wherein the one of the dielectric layers includes the portion having the thickness of 3.5 micrometers or more and 3.7 micrometers or less.

6. A multilayer ceramic electronic component comprising:
a ceramic body including dielectric layers and first and second internal electrodes alternately laminated in a thickness direction of the ceramic body with respective dielectric layers disposed therebetween to be respectively exposed to first and second external surfaces of the ceramic body opposing each other in a length direction of the ceramic body; and
first and second external electrodes disposed on the first and second external surfaces of the ceramic body and connected to the first and second internal electrodes, respectively,
wherein a distance between the first and second internal electrodes, which are immediately adjacent to each other, in the thickness direction is 3.5 micrometers or more, based on a center of the ceramic body in the thickness direction, the ceramic body further includes a step absorption member disposed in a lateral margin portion disposed on one side of the ceramic body in a width direction of the ceramic body, and in a width direction-thickness cross-section, an end portion of the first internal electrode and an end portion of the second internal electrode immediately adjacent to the first internal electrode and connected to the step absorption members are bent in opposite directions.

7. The multilayer ceramic electronic component of claim 6, wherein the ceramic body further includes a second dielectric layer laminated between the dielectric layer and the second internal electrode.

8. The multilayer ceramic electronic component of claim 6, wherein the ceramic body further includes a cover layer disposed on a top surface or a bottom surface of the first and second internal electrodes, and the cover layer has a thickness greater than the distance between the first and second internal electrodes in the thickness direction.

9. The multilayer ceramic electronic component of claim 6, wherein the distance between the first and second internal electrodes, which are immediately adjacent to each other, is equal to or greater than twice a thickness of one of the first and second internal electrodes.

10. The multilayer ceramic electronic component of claim 9, wherein an average of the respective thicknesses of the first and second internal electrodes is greater than zero micrometer and less than 1.0 micrometer.

11. The multilayer ceramic electronic component of claim 6, wherein the distance between the first and second internal electrodes, which are immediately adjacent to each other, in the thickness direction is 3.5 micrometers or more and 3.7 micrometers or less, based on the center of the ceramic body in the thickness direction.

12. A multilayer ceramic electronic component comprising:

a ceramic body including dielectric layers and first and second internal electrodes alternately laminated in a thickness direction of the ceramic body with respective dielectric layers disposed therebetween to be respectively exposed to first and second external surfaces of the ceramic body opposing each other in a length direction of the ceramic body; and first and second external electrodes disposed on the first and second external surfaces of the ceramic body and connected to the first and second internal electrodes, respectively, wherein one of the dielectric layers includes a portion having a thickness of 3.5 micrometers or more, one of the first and second internal electrodes includes end portions in a width direction of the ceramic body are bent in one direction, with respect to a central portion of the one of the internal electrodes, another of the first and second internal electrodes includes end portions in the width direction are bent in in another direction opposite to the one direction, with respect to a central portion of the another of the internal electrodes, the one of the first and second internal electrodes and the another of the first and second internal electrodes are immediately adjacent.

13. The multilayer ceramic electronic component of claim 12, wherein the ceramic body further includes a cover layer disposed on a top surface or a bottom surface of the first and second internal electrodes, and the cover layer has a thickness greater than the thickness of the portion of the one of the dielectric layers.

14. The multilayer ceramic electronic component of claim 12, wherein the thickness of the portion of the one of the dielectric layers is equal to or greater than twice a thickness of one of the first and second internal electrodes.

15. The multilayer ceramic electronic component of claim 14, wherein an average of the respective thicknesses of the first and second internal electrodes is greater than zero micrometer and less than 1.0 micrometer.

16. The multilayer ceramic electronic component of claim 12, wherein the one of the dielectric layer includes the portion having the thickness of 3.5 micrometers or more and 3.7 micrometers or less.

* * * * *